(12) United States Patent
Sansone

(10) Patent No.: US 7,024,019 B2
(45) Date of Patent: Apr. 4, 2006

(54) METHOD AND SYSTEM FOR IDENTIFYING MAIL PIECES HAVING SIMILAR ATTRIBUTES TO SUSPECTED CONTAMINATED MAIL PIECES

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 803 days.

(21) Appl. No.: 10/138,967

(22) Filed: May 2, 2002

(65) Prior Publication Data
US 2003/0206643 A1 Nov. 6, 2003

(51) Int. Cl.
*G06K 9/00* (2006.01)

(52) U.S. Cl. .................. 382/101; 209/584; 707/6; 705/404

(58) Field of Classification Search ........... 382/101; 209/584; 705/404; 707/6
See application file for complete search history.

(56) References Cited

U.S. PATENT DOCUMENTS

| | | | | |
|---|---|---|---|---|
| 5,917,925 | A * | 6/1999 | Moore | 382/101 |
| 6,266,431 | B1 * | 7/2001 | Kiyono | 382/101 |
| 6,697,500 | B1 * | 2/2004 | Woolston et al. | 382/101 |
| 6,740,836 | B1 * | 5/2004 | Ryan et al. | 209/584 |
| 6,765,490 | B1 * | 7/2004 | Lopez et al. | 340/632 |
| 6,770,831 | B1 * | 8/2004 | Rojas et al. | 209/584 |
| 6,817,517 | B1 * | 11/2004 | Gunther | 235/375 |
| 2003/0072469 | A1 * | 4/2003 | Alden | 382/101 |

* cited by examiner

*Primary Examiner*—Samir Ahmed
*Assistant Examiner*—Anand Bhatnagar
(74) *Attorney, Agent, or Firm*—Brian A. Lemm; Angelo N. Chaclas

(57) ABSTRACT

A method and system to identify mail pieces that have similar attributes to mail pieces suspected of being contaminated are provided. A data center communicates with each postal unit where mail enters into the postal system. When a postal unit detects a mail piece that may be contaminated, a record of the mail piece is made and sent to the data center. The data center archives the record of the suspect mail pieces in a database, and provides each record to all postal units on a real-time basis. As mail is inducted by each of the postal units, an image is taken of each mail piece and the image is compared to the records of suspect mail pieces stored in the data center. If a mail piece has similar attributes to a suspect mail piece, it will be immediately identified, regardless of the postal unit where it is entering the postal system.

61 Claims, 5 Drawing Sheets

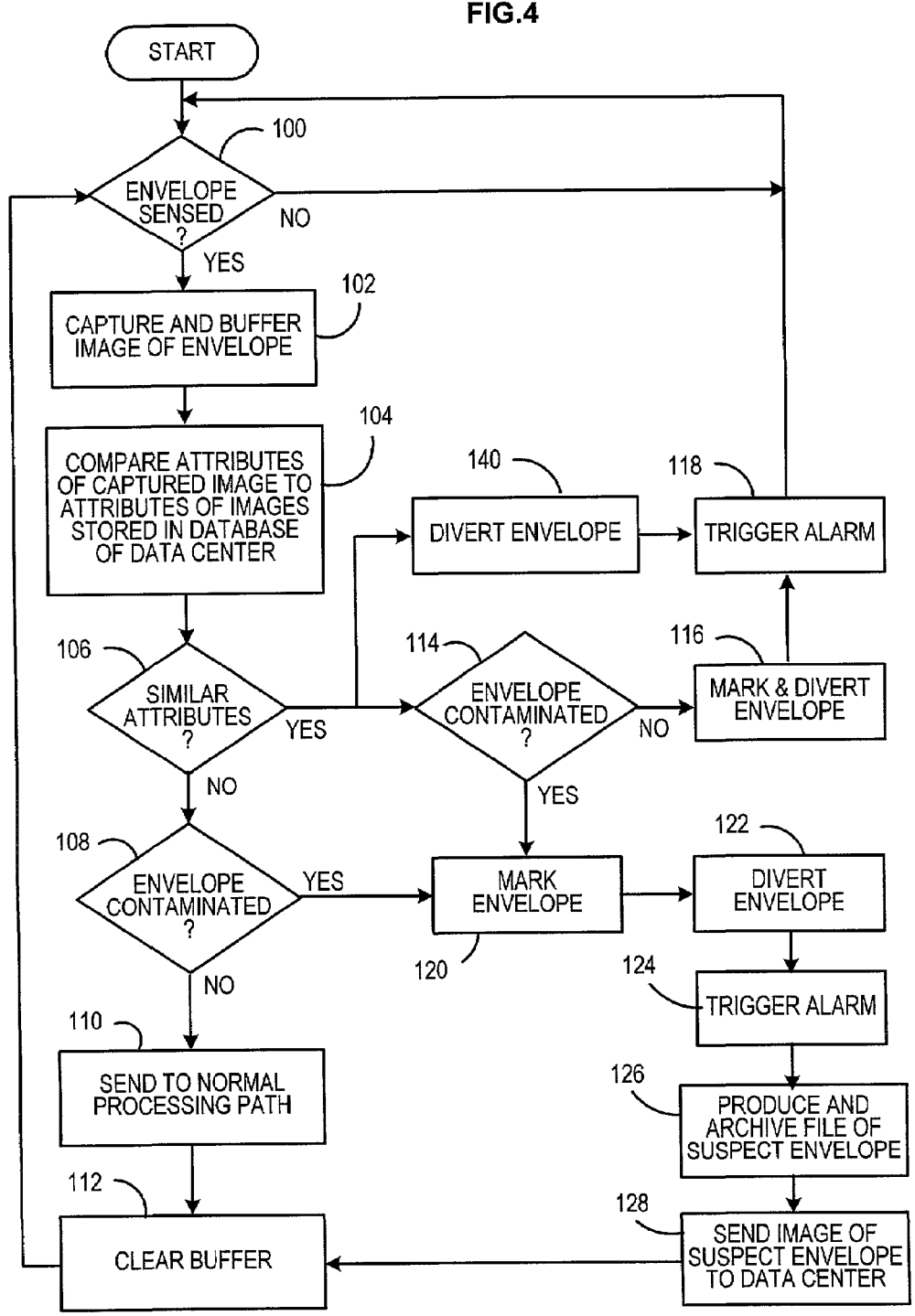

METHOD AND SYSTEM FOR IDENTIFYING MAIL PIECES HAVING SIMILAR ATTRIBUTES TO SUSPECTED CONTAMINATED MAIL PIECES

FIELD OF THE INVENTION

The invention disclosed herein relates generally to the processing of mail, and more particularly to a method and system to identify mail pieces that have similar attributes to mail pieces that are suspected of being contaminated.

BACKGROUND OF THE INVENTION

The United States accounts for the largest domestic letter traffic in the world, handling almost 200 billion pieces of mail each year. The United States Postal Service (USPS) employs more than 850,000 employees and operates more than 44,000 post offices throughout the country. In many respects, the economy of the country is dependent upon the postal system being able to efficiently and quickly deliver mail pieces. Any type of major disruption in the delivery of mail could have potentially serious detrimental effects on the country as a whole.

Recently, attempts have been made to disrupt the postal system and use it as a weapon of terror and fear by the inclusion of harmful chemical or biological contaminants, such as, for example, the spore-forming bacterium *Bacillus anthracis* (anthrax), within or on a mail piece. Such contaminants can be carried in several forms, including for example, a powder form. The harmful effects of only a few contaminated mail pieces can be far reaching, as cross-contamination of other mail pieces can easily occur when the mail pieces come in contact with each other or are passed through the same machines during sorting. The Centers for Disease Control and Prevention estimates that tens of thousands of mail pieces could have become cross-contaminated from only two contaminated mail pieces. The use of the postal system for such purposes has resulted in the need for a reliable way to detect mail pieces suspected of being contaminated before they are processed by the postal authority, thereby significantly reducing any cross-contamination by the contaminated mail pieces.

Ideally, it would be desirous for the postal authority to examine and/or test each piece of mail individually for any possible contaminants before it enters the mail system, thereby isolating any contaminated mail pieces and preventing any cross-contamination. If a suspected mail piece is found, it would also be desirous to be able to identify any other mail pieces that have similar attributes, and therefore may have been sent by the same sender of the suspected contaminated mail piece, and remove them from the mail processing stream for inspection as well. By removing other mail pieces with similar attributes to a suspect mail piece, cross-contamination can be prevented if, in fact, the other mail pieces are also contaminated. Even if the other mail pieces are not contaminated, it may still be possible to collect evidence, based on the other non-contaminated similar mail pieces, with respect to the actual origin and sender of the contaminated mail piece. With the large volume of mail processed daily and the large number of post offices where mail is inducted into the postal system, however, it is currently not possible to timely and cost effectively identify any mail pieces that have similar attributes to a suspected contaminated mail piece. It is imperative that any such identification be capable of being performed both cost effectively and quickly to avoid delays in processing and delivering the mail.

Thus, there exists a need for a reliable way that quickly and cost effectively identifies mail pieces that are similar to mail pieces suspected of being contaminated.

SUMMARY OF THE INVENTION

The present invention alleviates the problems associated with the prior art and provides a method and system that can quickly and cost effectively identify mail pieces that have similar attributes to mail pieces suspected of being contaminated.

In accordance with the present invention, a data center communicates with each postal unit where mail enters into the postal system. When a postal unit detects a mail piece that may be contaminated, a record of the mail piece is made and sent to the data center. The record includes, for example, an image of the face of each suspect mail piece, along with information identifying the location, date and time of induction of the suspect mail piece. The data center archives the record of the suspect mail pieces in a database, and provides each record to all postal units on a real-time basis. Each postal unit, therefore, is provided with a record of all suspect mail pieces, regardless of the actual postal unit where the suspect mail piece was detected.

As mail is inducted by each of the postal units, an image is taken of the face of each mail piece and the image is compared to the records of suspect mail pieces received from the data center. If a mail piece has similar attributes to a suspect mail piece, such as, for example, similar markings, return address, handwriting style, etc., it will be immediately identified, regardless of the postal unit where it is entering the postal system. The similar mail piece can then be diverted from the normal processing path for further inspection, thereby preventing cross-contamination of other mail pieces and processing equipment if it is contaminated, or providing possible evidence with respect to the actual sender of the suspect mail piece.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 4 illustrates in flow diagram form a process of identifying mail pieces that have similar attributes to mail pieces that are suspected of being contaminated according to an embodiment of the present invention.

DETAILED DESCRIPTION OF THE PRESENT INVENTION

Figure 1:
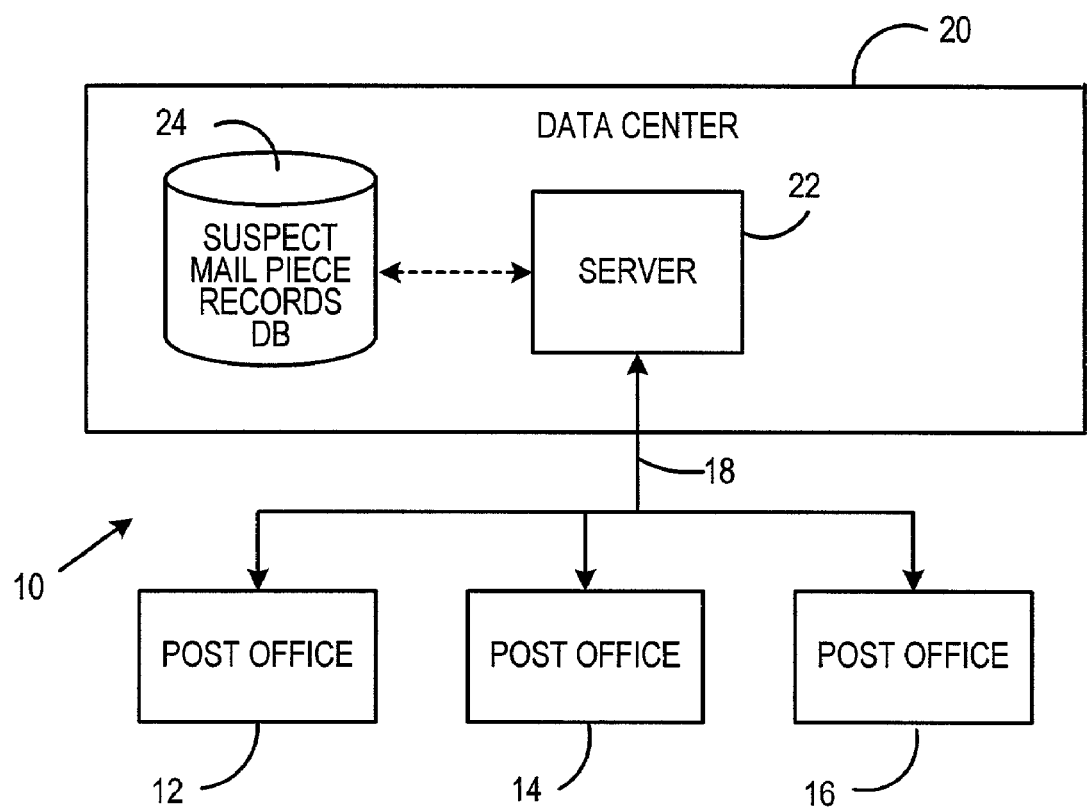
FIG. 1 illustrates in block diagram form a system for identifying mail pieces that have similar attributes to mail pieces that are suspected of being contaminated according to the present invention.

In describing the present invention, reference is made to the drawings, wherein there is seen in FIG. 1 in block diagram form a system 10 for identifying mail pieces that have similar attributes to mail pieces that are suspected of being contaminated according to the present invention. System 10 includes a plurality of post offices 12, 14, 16, each of which communicates with a data center 20 via communication link 18. Communication link 18 could be, for example, a wired link via a network, such as the Internet, a dedicated telecommunication link, cable link, or a wireless link, such as, for example, a cellular link, or any other type of communication link suitable for transfer of data between the data center 20 and the post offices 12, 14, 16. While only three post offices 12, 14, 16 are illustrated, it should be understood that the present invention is not so limited and preferably each of the more than 44,000 post offices throughout the country would be included in the system 10.

Data center 20 includes a data server 22. Server 22 controls operation of the data center 20, and provides connectivity of data center 20 to each of the post offices 12, 14, 16. Data center 20 further includes a database 24 coupled to server 22 for storing suspect mail piece records (further described below). Thus, records received from each post office 12, 14, 16 are processed by server 22 and stored in database 24.

Figure 2A:
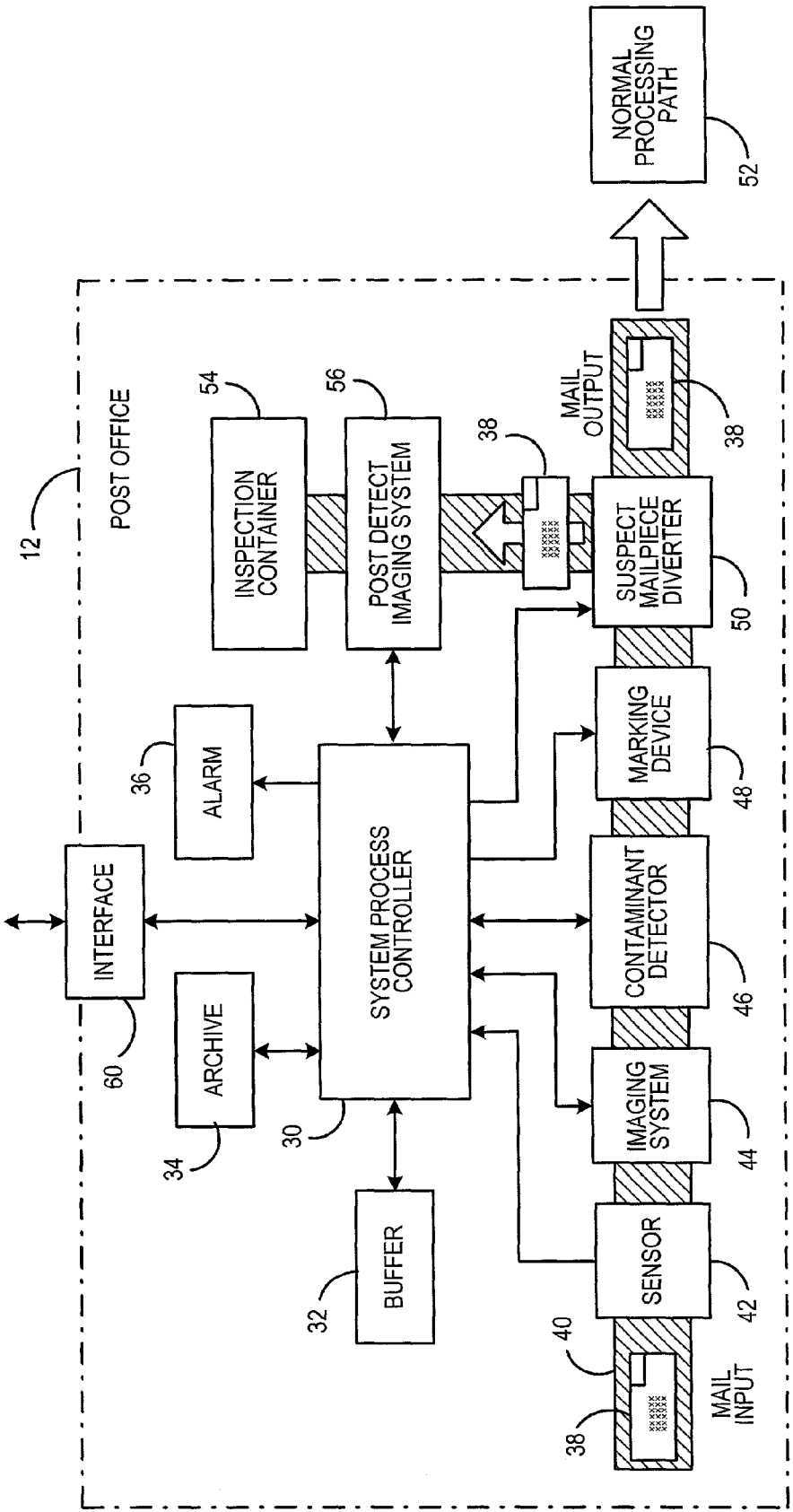
FIG. 2A illustrates in block diagram form the components of a post office that utilizes the system for identifying mail pieces that have similar attributes to mail pieces that are suspected of being contaminated according to an embodiment of the present invention.

Referring now to FIG. 2A there is illustrated in block diagram form the components of post office 12 for identifying mail pieces that have similar attributes to mail pieces that are suspected of being contaminated according to an embodiment of the present invention. Post office 12 includes a system process controller 30 upon which process routines are performed to implement the present invention. Controller 30 is coupled to an interface 60, which provides communication with data center 20 via communication link 18 (FIG. 1). A buffer 32 is provided for storing information utilized by controller 30 as will be further described below. It should be understood that while a single buffer 32 is illustrated, the invention is not so limited and one or more memory devices/buffers could be utilized to store any information needed by controller 30. Optionally, an archive 34 may be provided for archiving information related to any suspect mail pieces as further described below. An alarm 36, such as, for example, an audio or visual indicator, is coupled to controller 30 to indicate to an operator that a suspect mail piece or a mail piece having similar attributes to a suspect mail piece has been detected as further described below.

Mail pieces, such as, for example, an envelope 38, enter the post office 12 at mail input 40 and are detected by a sensor 42. Post office 12 includes an imaging system 44, such as, for example, an envelope face scanner, for capturing an image of the mail pieces as they are received by the post office 12. The captured images of the mail pieces are stored in the mail piece face image buffer 32. The mail pieces are then passed to a contaminant detector 46 to determine if the mail pieces may contain a harmful contaminant. Detector 46 can be any type of detector, such as, for example, a vibrating tray scale as described in U.S. application Ser. No. 10/139,161, which is hereby incorporated by reference. Other types of detectors may also be used, such as, for example, phosphorescent detectors, chemical sensors, air analysis sensors (sometimes referred to as "sniffers"), fluorometers, x-ray detectors, or any other type of detector capable of detecting one or more types of contaminants that may be placed on or in a mail piece.

Post office 12 further includes an optional marking device 48, to provide a visual mark on the face of suspected mail pieces, and a suspect mail piece diverter 50. If contaminant detector 46 determines that a mail piece, such as envelope 38, does not contain a contaminant, controller 30 will cause diverter 50 to pass the mail piece into the normal processing path 52. If, however, contaminant detector 46 determines that a mail piece may contain a contaminant, then controller 30 will cause diverter 50 to divert the mail piece to an alternate path, such as, for example, to an inspection container 54, for further evaluation and inspection of the mail piece. Post office 12 can further include a second imaging device 56 to provide an image of the diverted mail piece, including the mark put on the mail piece by marking device 48, to system controller 30 for archiving in archive 34 if provided. Alternatively, if imaging system 56 is not provided, then the image captured by imaging system 44 can be taken from buffer 32 and archived in archive 34.

According to the present invention, in addition to archiving the image of a suspect mail piece in archive 34, post office 12 will send the image to data center 20 via interface 60 and communication link 18. Server 22 of data center 20 will process the image of a suspected mail piece and store a record of the mail piece in database 24. Thus, since data center 20 preferably communicates with each post office operated by the postal authority, database 24 will include records of every mail piece that is suspected of being contaminated, regardless of the post office location where the mail piece was inducted into the postal system.

Figure 2B:
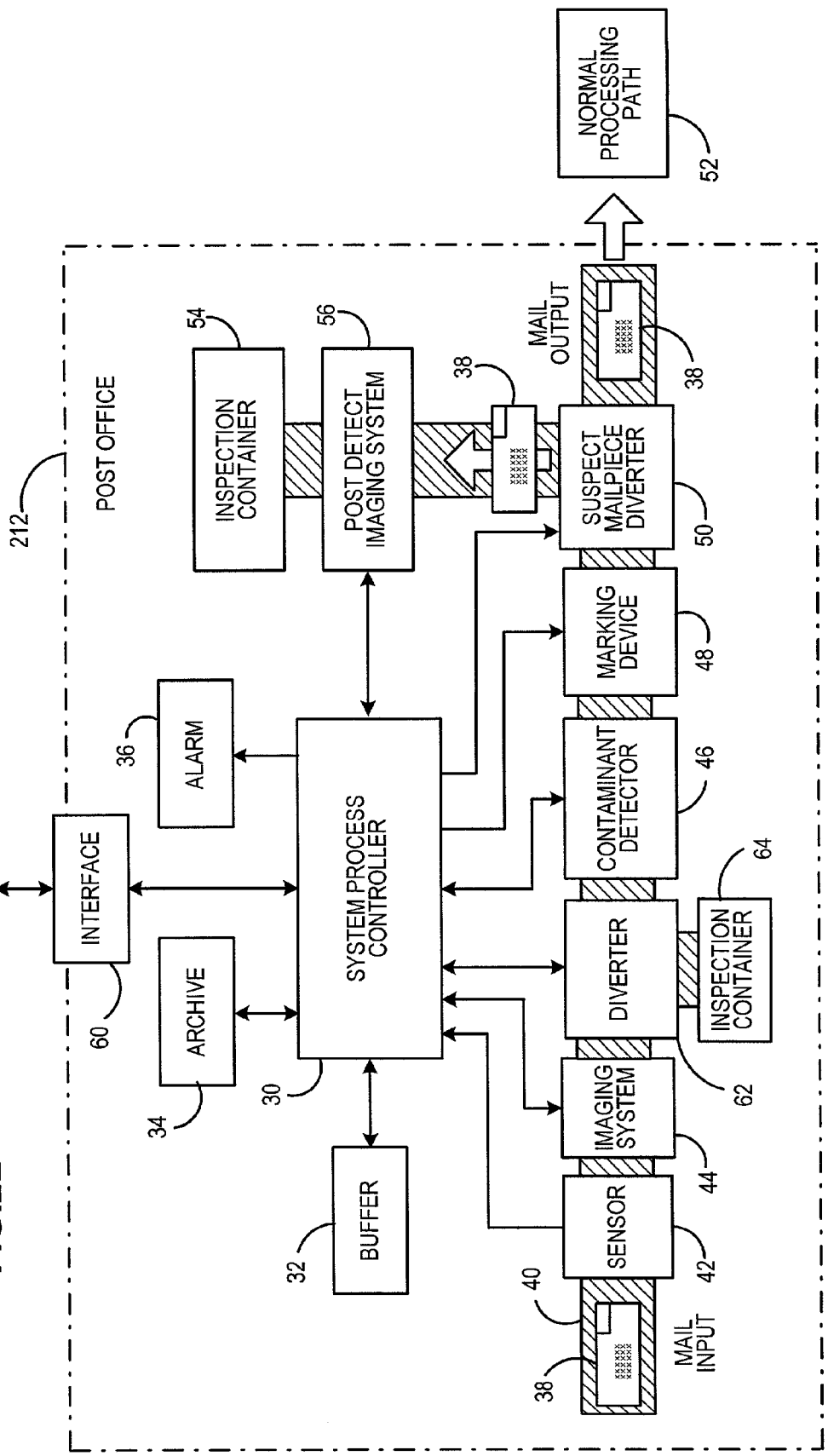
FIG. 2B illustrates in block diagram form the components of a post office that utilizes the system for identifying mail pieces that have similar attributes to mail pieces that are suspected of being contaminated according to another embodiment of the present invention.

FIG. 2B illustrates in block diagram form the components of a post office 212 for identifying mail pieces that have similar attributes to mail pieces that are suspected of being contaminated according to another embodiment of the present invention. Post office 212 is similar to post office 12, except that it includes a diverter 62 located between imaging system 44 and contaminant detector 46. Diverter 62 is coupled to controller 30, and can divert mail pieces to an inspection container 64 or pass a mail piece to contaminant detector 46 based on control signals from controller 30.

Figure 3:
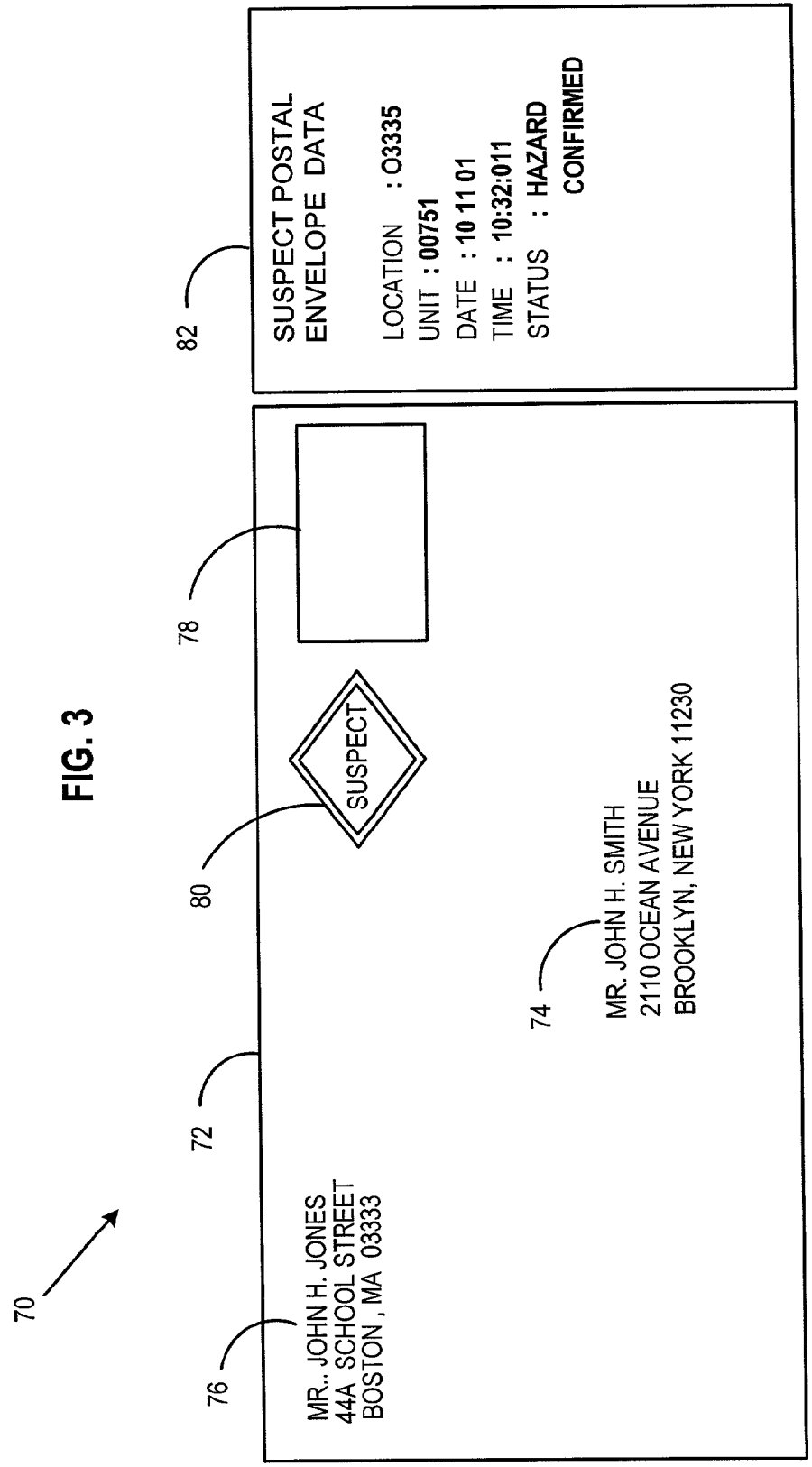
FIG. 3 illustrates a data record for a suspect mail piece according to an embodiment of the present invention.

Referring now to FIG. 3, there is illustrated an example of a data record 70 of a suspect envelope stored in database 24 of data center 20. Data record 70 includes, for example, an image 72 of the face of the mail piece, such as, for example, the face of envelope 38, including the addressee information 74, return address information 76, postage or indicia information 78, and, if imaging system 56 is present, a mark 80 printed on the mail piece by marking device 48. If the image for data record 70 is from imaging system 44, then mark 80 will not be present. Data record 70 could also include a data information field 82 that includes identifying information for the suspect envelope 38, such as, for example, the location number and unit number for the post office 12 that processed the envelope 38, the date and time that the envelope 38 was processed, and a current status of the envelope 38, i.e., whether the contents of the envelope 38 have been identified as hazardous or not upon further inspection.

The complete operation of the system 10 for identifying mail pieces that have similar attributes to mail pieces that are suspected of being contaminated will now be described with respect to the flow diagram of FIG. 4. Suppose, for example, an envelope 38 is being inducted by post office 12. In step 100, it is determined if the envelope 38 is sensed by sensor 42. If the envelope 38 is not sensed, then sensing continues until an envelope 38 is sensed. If an envelope is sensed in step 100, then in step 102 an image of the envelope is captured by imaging system 44 and buffered in buffer 32.

In step 104, controller 30 compares the image of the envelope 38 to images of suspected mail pieces that are stored as records in database 24 of data center 20. Specifically, one or more attributes of the envelope 38 are compared to the attributes of the images stored in database 24. Such attributes could include, for example, similar markings on the envelope 38, including return address, addressee information, or other types of markings, similar handwriting or printing style for any markings on the envelope, or similar postage applied to the envelope. Preferably, the communication link 18 between the data center 20 and each post office 12, 14, 16 is a dedicated link, and therefore database 24 is updated with images of suspected mail pieces from each of the post offices 12, 14, 16 on a real-time basis. Accordingly, the database 24 will have images of mail pieces suspected of being contaminated on a real-time basis, regardless of the post office at which the suspect mail pieces were inducted. Thus, the image of envelope 38 will be compared with all suspected mail pieces that have been attempted to be inducted into the postal system anywhere in the country.

In step 106, it is determined if one or more of the attributes of envelope 38 match the attributes of any of the suspected mail pieces whose images are stored in database 24. If more than one matching attribute is required for controller 30 to determine that envelope 38 has similar attributes to a suspect mail piece, a threshold limit could be set for the minimum number of attributes that must be the same, such as, for example, matching two or three attributes. Preferably, if multiple attributes are required, each of the attributes must be from a single record, i.e., a single suspect mail piece, stored in database 24. Alternatively, if multiple attributes are required, each attribute could be from a separate record, i.e., different suspect mail pieces, stored in database 24.

If in step 106 it is determined that envelope 38 does not have a similar attribute or similar attributes to any mail pieces suspected of being contaminated whose records are stored in database 24, then in step 108 it is determined if the envelope 38 is contaminated, i.e., contains any type of contaminant material, utilizing contaminant detector 46. If in step 108 it is determined that envelope 38 is not contaminated, then in step 110 the envelope 38 is passed through the diverter 50 to the normal processing path 52. In step 112, buffer 32 is cleared. Alternatively, buffer 32 need not be cleared and can simply be overwritten during the next processing cycle. The method then returns to step 100 to repeat the processing when another envelope is sensed.

If in step 106 it is determined that envelope 38 has one or more attributes that are similar to the attributes of one or more of the suspect mail pieces from database 24, then in step 114 it is determined if the envelope 38 is contaminated, i.e., contains any type of contaminant material, utilizing contaminant detector 46. If in step 114 it is determined that envelope 38 is not contaminated, then in step 116 the envelope 38 is diverted by diverter 50 to inspection container 54 for further inspection and evaluation. Optionally in step 116, the envelope 38 could be marked by marking device 48 with a mark indicating that the envelope 38 has similar attributes to a suspect mail piece, including for example, identification of the suspect mail piece to which it is similar utilizing the data information field 82 (FIG. 3). Since envelope 38 has similar attribute(s) to a suspect mail piece, the envelope 38 could provide possible evidence with respect to the actual sender of the suspect mail piece.

Additionally, if contaminant detector 46 fails to identify a contaminant contained within envelope 38, the envelope 38 will still be diverted from the normal mail processing path since it has similar attributes to a mail piece already identified as being suspect. This provides an additional level of security to prevent cross-contamination of other mail pieces and equipment used for processing the mail, as well as an additional level of safety for the intended recipient and anyone else that handles the mail should a contaminated envelope not be detected by detector 46.

Optionally, if the inducting post office is post office 212 as illustrated in FIG. 2B, then if in step 106 it is determined that envelope 38 has one or more attributes that are similar to the attributes of one or more of the suspect mail pieces from database 24, then in step 140 the envelope 38 will be immediately diverted from the processing stream by diverter 62 to inspection container 64 for further inspection and evaluation. Since envelope 38 has similar attribute(s) to a suspect mail piece, the envelope 38 could provide possible evidence with respect to the actual sender of the suspect mail piece.

From either step 140 or step 116, the method proceeds to step 118 where controller 30 triggers the alarm 36 to indicate to an operator that envelope 38 is being diverted to inspection container 64 or 54. It should be understood that triggering the alarm 36 could be optional. The method then returns to step 100 to repeat the processing when another envelope is sensed.

If in either step 108 or step 114 it is determined that envelope 38 is contaminated, then in step 120 the envelope 38 is passed to marking device 48 where it is marked to identify the envelope 38 as suspected of containing a contaminant, and in step 122 the envelope 38 is diverted by diverter 50 to inspection container 54 for further examination and evaluation. In step 124, controller 30 triggers the alarm 36 to alert an operator that envelope 38 is a suspect mail piece and is being diverted to inspection container 54. Alarm 36 can provide a different signal in step 124 than in step 118 to alert the operator that the mail piece that is being diverted has been determined to be actually contaminated (step 124) as opposed to being diverted because of matching attributes (but not contaminated or not tested for contamination) (step 118). If imaging system 56 is provided, then in step 126 an image of the envelope 38 is taken and a file of the suspect envelope 38, as described with respect to FIG. 3, is produced and stored in archive 34. Alternatively, if imaging system 56 is not present, the image taken by imaging system 44, and stored in buffer 32, can be used to produce a file for archiving in archive 34.

In step 128, the file of the suspect envelope 38 is sent to data center 20 for storing in database 24. Accordingly, each of the other post offices 14, 16 will have immediate access to the record of suspect envelope 38 to compare against all incoming mail at those locations as well. In step 112, buffer 32 is cleared. Alternatively, buffer 32 need not be cleared and can simply be overwritten during the next processing cycle. The method then returns to step 100 to repeat the processing when another envelope is sensed.

Thus, according to the present invention, a method and system that can quickly and cost effectively identify mail pieces that have similar attributes to mail pieces suspected of being contaminated are provided. In accordance with the present invention, a data center 20 communicates with each postal unit 12, 14, 16 where mail enters into the postal system. When a postal unit 12, 14, 16 detects a mail piece that may be contaminated, a record 70 of the mail piece is made and sent to the data center 20. The record includes, for example, an image of the face of each suspect mail piece, along with information identifying the location, date and time of induction of the suspect mail piece. The data center 20 archives the record of the suspect mail pieces in a database 24, and provides each record to all postal units 12, 14, 16 on a real-time basis. Each postal unit 12, 14, 16, therefore, is provided with a record of all suspect mail pieces, regardless of the actual postal unit where the suspect mail piece was detected.

As mail is inducted by each of the postal units 12, 14, 16, an image is taken of the face of each mail piece and the image is compared to the records of suspect mail pieces received from the data center 20. If a mail piece has similar attributes to a suspect mail piece, such as, for example, similar markings, return address, handwriting style, etc., it will be immediately identified, regardless of the postal unit 12, 14, 16 where it is entering the postal system. The similar mail piece can then be diverted from the normal processing path for further inspection, thereby preventing cross-contamination of other mail pieces and processing equipment if it is found to be contaminated, or providing possible evidence with respect to the actual sender of the suspect mail piece.

It should be understood that although the present invention was described with respect to mail processing by a post office, the present invention is not so limited and can be utilized in any application in which mail is received or sent. For example, the detection system could also be utilized by a business or company upon receipt of the mail or before sending mail. By utilizing the present invention at mail acceptance, prior to sorting the mail in the mailroom for internal delivery, any mail pieces suspected of containing a contaminant or similar to a mail piece suspected of containing a contaminant can be isolated and removed from the processing system, thereby protecting the intended recipient or other office personnel from possible exposure to the contaminant, preventing contamination of the company's sorting machines, preventing cross-contamination of any other mail pieces, and providing possible evidence with respect to the actual sender of the contaminated mail piece.

While preferred embodiments of the invention have been described and illustrated above, it should be understood that they are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for identifying a mail piece having a similar attribute to a suspected contaminated mail piece comprising:
   a data center including a data base, the data base storing data associated with the suspected contaminated mail piece, the data including attributes of the suspected contaminated mail piece;
   a plurality of postal units for inducting mail pieces, each of the plurality of postal units comprising:
      an interface to provide communication between the data center and each respective postal unit, the data center providing the data associated with the suspected contaminated mail piece to each postal unit;
      an imaging system to capture an image of a mail piece being inducted; and
      a controller coupled to the imaging system and the interface, the controller comparing at least one attribute of the mail piece being inducted with the attributes of the suspected contaminated mail piece received from the data center.

2. The system according to claim 1, wherein each of the postal units further comprises:
   a detection device coupled to the controller to detect a possible contaminant in the mail piece being inducted, wherein if a possible contaminant is detected in the mail piece being inducted, the controller sends information associated with the mail piece being inducted to the data center.

3. The system according to claim 2, wherein the information associated with the mail piece includes the image of the mail piece.

4. The system according to claim 2, wherein the information associated with the mail piece includes an identification of the postal unit where the mail piece was inducted.

5. The system according to claim 2, wherein the data center stores at least a portion of the information associated with the mail piece in the data base and sends the at least a portion of the information associated with the mail piece to a portion of the plurality of postal units.

6. The system according to claim 2, wherein each of the plurality of postal units further comprises:
   a diverter to divert the mail piece being inducted from a normal processing path if the controller determines the mail piece being inducted has at least one similar attribute to a suspected contaminated mail piece or if the detection device detects a possible contaminant in the mail piece being inducted.

7. The system according to claim 2, wherein each of the plurality of postal units further comprises:
   a marking device coupled to the detection device to mark the mail piece being inducted if a possible contaminant is detected.

8. The system according to claim 7, wherein each of the plurality of postal units further comprises:
   a second imaging system to capture an image of the mail piece being inducted including the mark from the marking device,
   wherein the information associated with the mail piece being inducted sent to the data center includes the image taken by the second imaging system.

9. The system according to claim 1, wherein each of the postal units further comprises:
   a diverter to divert the mail piece being inducted from a normal processing path if the controller determines the mail piece being inducted has at least one similar attribute to the suspected contaminated mail piece.

10. The system according to claim 9, wherein each of the postal units further comprises:
    a diverter to divert the mail piece being inducted from the normal processing path if the controller determines the mail piece being inducted has a plurality of similar attributes to the suspected contaminated mail piece.

11. The system according to claim 10, wherein the diverter diverts the mail piece being inducted from the normal processing path if the controller determines the mail piece being inducted has a plurality of similar attributes to a plurality of suspected contaminated mail pieces.

12. The system according to claim 1, wherein the controller compares at least one attribute of the mail piece being inducted with the attributes of a plurality of suspected contaminated mail pieces received from the data center.

13. The system according to claim 1, wherein the at least one attribute includes a return address.

14. The system according to claim 1, wherein the at least one attribute includes a handwriting style of information included on the mail piece.

15. The system according to claim 1, wherein the at least one attribute includes a marking on the mail piece.

16. The system according to claim 1, wherein the at least one attribute includes postage applied to the mail piece.

17. The system according to claim 1, wherein the data center communicates with at least one of the plurality of postal units via a network.

18. The system according to claim 17, wherein the network is a telecommunications network.

19. The system according to claim 1, wherein the data center communicates with at least one of the plurality of postal units via a wireless communication.

20. A postal unit for induction of mail comprising:
an interface to provide communication between a data center and the postal unit, the data center providing data associated with a suspected contaminated mail piece to the postal unit, the data including attributes of the suspected contaminated mail piece;
an imaging system to capture an image of a mail piece being inducted; and
a controller coupled to the imaging system and the interface, the controller comparing at least one attribute of the mail piece being inducted with the attributes of the suspected contaminated mail piece received from the data center.

21. The postal unit according to claim 20, further comprising:
a detection device coupled to the controller to detect a possible contaminant in the mail piece being inducted, wherein if a possible contaminant is detected in the mail piece being inducted, the controller sends information associated with the mail piece being inducted to the data center.

22. The postal unit according to claim 21, wherein the information associated with the mail piece includes the image of the mail piece.

23. The postal unit according to claim 21, wherein the information associated with the mail piece includes an identification of the postal unit where the mail piece was inducted.

24. The postal unit according to claim 21, further comprising:
a diverter to divert the mail piece being inducted from a normal processing path if the controller determines the mail piece being inducted has at least one similar attribute to a suspected contaminated mail piece or if the detection device detects a possible contaminant in the mail piece being inducted.

25. The postal unit according to claim 21, further comprising:
a marking device coupled to the detection device to mark the mail piece being inducted if a possible contaminant is detected.

26. The postal unit according to claim 25, further comprising:
a second imaging system to capture an image of the mail piece being inducted including the mark from the marking device,
wherein the information associated with the mail piece being inducted sent to the data center includes the image taken by the second imaging system.

27. The postal unit according to claim 20, further comprising:
a diverter to divert the mail piece being inducted from a normal processing path if the controller determines the mail piece being inducted has at least one similar attribute to the suspected contaminated mail piece.

28. The postal unit according to claim 20, further comprising:
a diverter to divert the mail piece being inducted from the normal processing path if the controller determines the mail piece being inducted has a plurality of similar attributes to the suspected contaminated mail piece.

29. The postal unit according to claim 28, wherein the diverter diverts the mail piece being inducted from the normal processing path if the controller determines the mail piece being inducted has a plurality of similar attributes to a plurality of suspected contaminated mail pieces.

30. The postal unit according to claim 20, wherein the controller compares at least one attribute of the mail piece being inducted with the attributes of a plurality of suspected contaminated mail pieces received from the data center.

31. The postal unit according to claim 20, wherein the at least one attribute includes a return address.

32. The postal unit according to claim 20, wherein the at least one attribute includes a handwriting style of information included on the mail piece.

33. The postal unit according to claim 20, wherein the at least one attribute includes a marking on the mail piece.

34. The postal unit according to claim 20, wherein the at least one attribute includes postage applied to the mail piece.

35. The postal unit according to claim 20, wherein the postal unit communicates with the data center via a network.

36. The postal unit according to claim 35, wherein the network is a telecommunications network.

37. The postal unit according to claim 20, wherein the postal unit communicates with the data center via a wireless communication.

38. A method for identifying a mail piece having a similar attribute to a suspected contaminated mail piece comprising the steps of:
receiving data associated with a suspected contaminated mail piece from a data center, the data including attributes of the suspected contaminated mail piece;
capturing an image of a mail piece being inducted; and
comparing at least one attribute of the mail piece being inducted, using the captured image, with the attributes of the suspected contaminated mail piece received from the data center.

39. The method according to claim 38, further comprising:
diverting the mail piece being inducted from a normal processing path if the controller determines the mail piece being inducted has at least one similar attribute to the suspected contaminated mail piece.

40. The method according to claim 38, further comprising:
diverting the mail piece being inducted from a normal processing path if the controller determines the mail piece being inducted has at least one similar attribute with each of a plurality of suspected contaminated mail pieces.

41. The method according to claim 38, further comprising:
detecting if the mail piece being inducted contains a possible contaminant; and
if a possible contaminant is detected in the mail piece being inducted, sending information associated with the mail piece being inducted to the data center.

42. The method according to claim 41, wherein the step of sending further comprises:
sending the image of the mail piece being inducted to the data center.

43. The method according to claim 41, wherein the step of sending further comprises:
sending an identification of a postal unit where the mail piece was inducted to the data center.

44. The method according to claim 41, further comprising:
diverting the mail piece being inducted from a normal processing path if a possible contaminant is detected in the mail piece.

45. The method according to claim 38, wherein the step of comparing further comprises:
comparing the at least one attribute of the mail piece being inducted with the attributes of a plurality of suspected contaminated mail pieces received from the data center.

46. The method according to claim 38, wherein the at least one attribute includes a return address.

47. The method according to claim 38, wherein the at least one attribute includes a handwriting style of information included on the mail piece.

48. The method according to claim 38, wherein the at least one attribute includes a marking on the mail piece.

49. The method according to claim 38, wherein the at least one attribute includes postage applied to the mail piece.

50. The method according to claim 38, wherein the step of receiving further comprises:
receiving the data associated with a suspected contaminated mail piece from the data center via a network communication.

51. The method according to claim 38, wherein the step of receiving further comprises:
receiving the data associated with a suspected contaminated mail piece from the data center via a wireless communication.

52. A method for inducting mail comprising the steps of:
determining if a first mail piece being inducted at a first postal unit is contaminated;
sending information associated with the first mail piece from the first postal unit to a data center if the first mail piece is suspected of being contaminated;
sending at least a portion of the information associated with the first mail piece from the data center to a second postal unit, the at least a portion of the information including attributes of the first mail piece;
capturing an image of a second mail piece being inducted at the second postal unit; and
comparing, at the second postal unit, at least one attribute of the second mail piece with the attributes of the first mail piece received from the data center.

53. The method according to claim 52, further comprising:
diverting the second mail piece from a normal processing path if it is determined that the second mail piece has at least one similar attribute to the first mail piece.

54. The method according to claim 52, further comprising:
determining, at the second postal unit, if the second mail piece contains a possible contaminant; and
if a possible contaminant is detected in the second mail piece, sending information associated with the second mail piece being inducted from the second postal unit to the data center.

55. The method according to claim 54, wherein the step of sending further comprises:
sending the image of the second mail piece to the data center.

56. The method according to claim 55, wherein the step of sending further comprises:
sending an identification of the second postal unit to the data center.

57. The method according to claim 54, further comprising:
sending at least a portion of the information associated with the second mail piece from the data center to the first postal unit, the at least a portion of the information including attributes of the second mail piece.

58. The method according to claim 52, wherein the at least one attribute includes a return address.

59. The method according to claim 52, wherein the at least one attribute includes a handwriting style of information included on the mail piece.

60. The method according to claim 52, wherein the at least one attribute includes a marking on the mail piece.

61. The method according to claim 52, wherein the at least one attribute includes postage applied to the mail piece.

* * * * *